United States Patent [19]
Kress et al.

[11] Patent Number: 5,328,304
[45] Date of Patent: Jul. 12, 1994

[54] REAMER

[75] Inventors: Dieter Kress, Aalen; Friedrich Häberle, Lauchheim, both of Fed. Rep. of Germany

[73] Assignee: Mapal Fabrik für Prazisionswerkzeuge Dr. Kress KG, Aalen, Fed. Rep. of Germany

[21] Appl. No.: 7,289

[22] Filed: Jan. 21, 1993

[30] Foreign Application Priority Data

Jan. 31, 1992 [DE] Fed. Rep. of Germany ....... 4202751

[51] Int. Cl.⁵ .................. B23B 41/16; B23B 51/00
[52] U.S. Cl. .................. 408/83; 175/399; 408/705
[58] Field of Search ............ 408/81, 83, 199, 226, 408/705; 175/399, 408

[56] References Cited

U.S. PATENT DOCUMENTS

| 3,751,177 | 8/1973 | Faber | 175/408 X |
| 4,596,498 | 6/1986 | Kress | 408/83 |
| 5,024,596 | 8/1991 | Brett et al. | 175/399 X |
| 5,163,524 | 11/1992 | Newton, Jr. et al. | 175/408 |
| 5,238,335 | 8/1993 | Nomura | 408/705 X |

FOREIGN PATENT DOCUMENTS 0312281  4/1989  European Pat. Off. .
0410342  1/1991  European Pat. Off. .

Primary Examiner—Steven C. Bishop
Attorney, Agent, or Firm—Anderson Kill Olick & Oshinsky

[57] ABSTRACT

A reamer includes a cutting tip mounted in the circumferential wall of the base body of the cutting head of the reamer, and at least one guide bead located in a groove formed in the base body and extending in the longitudinal direction of the base body. The guide bead has a contact surface containing at least regionwise a diamond material.

20 Claims, 3 Drawing Sheets

REAMER

BACKGROUND OF THE INVENTION

The invention relates to a reamer, in particular to a single-cutter reamer having a base body in the circumferential wall of which, a cutting tip and at least one guide bead, received in a groove extending in the longitudinal direction of the base body, are mounted. Single-cutter reamers of the described type are used for machining bore surfaces in workpieces. For obtaining a bore with optimal surface qualities and very precise bore dimensions, a relative rotation between the workpiecee and a tool, the reamer, is effected, and the reamer is introduced into the bore of the workpiece. By rotation of the tool, chips are cut of the bore wall with the cutting edge of the cutting tip, which cutting edge has an orbit that is larger then the orbit of the outermost surface of the guide bead of the reamer. The reamer is guided inside the bore by a least one, preferably two guide beads. Because the cutting tip exerts a cutting force on the bore wall, the guide beads apply a corresponding supporting force. The resulting friction between the guide beads and the bore wall leads to build-up of the material of the machined bore wall on the guide beads, especially in the regions of the guide bead that contact the bore wall under high pressure. Because of the build-up of material on the guide beads, the once established diameter cannot be maintained. Because of this, a reliable guiding of the tool inside the bore cannot be assured any more, and fluctuations, which lead to a non-round bore with reduced surface qualities, take place.

Accordingly, the object of the invention is a reamer having an extremely long service life due to a reduced build-up of material on the guide beads.

SUMMARY OF THE INVENTION

This and other objects of the invention, which will become apparent hereinafter, are achieved by providing a reamer in which the contact surface of the at least one of the guide beads contains at least regionwise, a diamond material. Providing the contact surface of the at least one guide bead, at least regionwise, with a diamond material, permits to substantially reduce the material build-up on the contact surface, so that the desired qualities of the machine bore can be maintained much longer. This means, reliably maintaining, on one hand, the selected bore diameter and, on the other hand, the desired quality of the bore surface.

Preferably, in one embodiment of a reamer according to invention, the whole outer or contact surface of the at least one guide bead contains a diamond material. During machining of a bore, it may happen that different regions of the outer surface of the guide bead are in contact with the bore wall. When the whole outer surface is of a diamond material, it is assured that the build-up and, therefore, the wear, are reduced to a minimum.

Preferably, the one embodiment of the reamer includes a guide bead having a base body made of a metal, preferably hard metal, and a through or continuous diamond padding thereon. Such a guide bead can be cheaply produced with known methods and is characterized by stability, which is adequate for its use in reamers, so that with use of such guide beads in reamers, only a small amount of rejects is to be expected.

A particularly preferred reamer includes two guide beads arranged in its circumferential wall, with one guide bead being located, with respect to the cutting tip at angle of about 45°, when viewing in the rotational direction of the reamer, and the other guide bead being located opposite the cutting tip, with contact surfaces of both guide beads consisting of a diamond material. The guide bead which is located opposite the cutting tip, is subjected to especially high friction forces. It is therefore important that specifically this guide bead is protected from wear by providing a diamond layer thereon. A further protection against the material build up and, therefore, the wear, is achieved by providing a diamond layer on the second guide bead, which is located adjacent to the cutting tip. This assures an especially long service life of the tool.

The above-mentioned and other features and objects of the invention and manner of attaining them will become more apparent and the invention itself will be best understood form the following detailed description of the preferred embodiments of the invention when read with reference to the accompanying drawings.

DETAILED DESCRIPTION OF THE PREFERRED EMBODIMENTS

Figure 1:
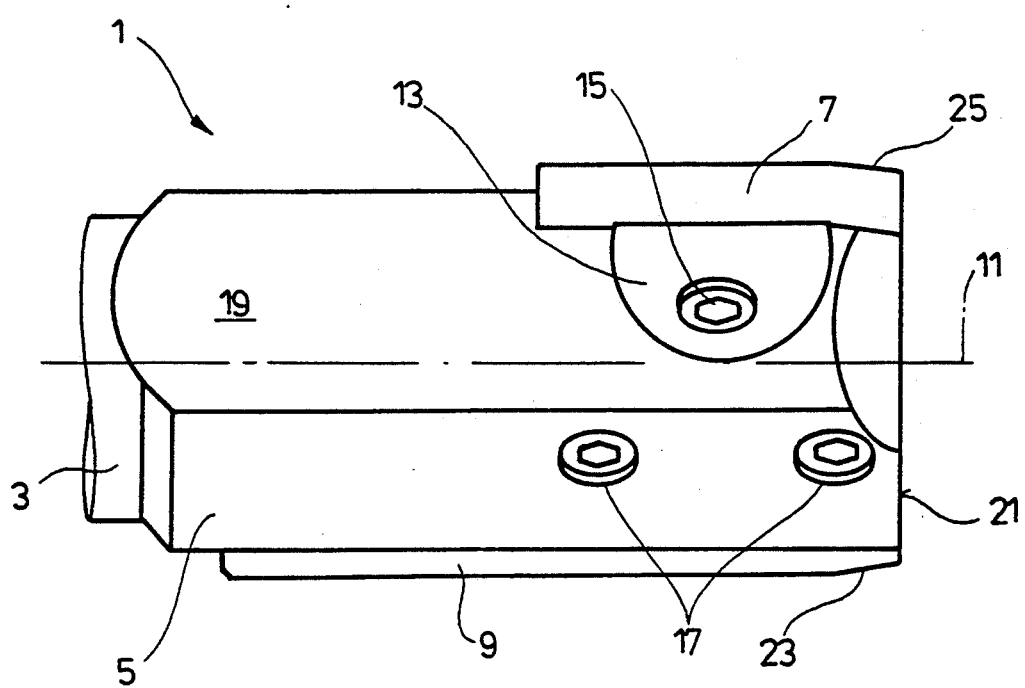
FIG. 1 shows a side view of a front portion and a cutting head of a reamer according to the present invention.

FIG. 1 shows a reamer the shank 3 of which, shown only partially, passes into a cutting head 5 which is provided with grooves for receiving a cutting tip 7 and a first guide bead 9. The base surface of each of the cutting tip and the guide bead extends substantially parallel to the central axis 11 of the reamer 1. The cutting tip 7 is fixed to the cutting head 5 in a known manner by a clamping lug 13 which is secured to the cutting head 5 with a tightening bolt 15. The reamer 1 is further provided with two adjusting screws 17, which serve for radial adjustment of the cutting tip 7 and which, in a known manner, act through drive wedges, on the bottom side of the cutting tip 7, so that the cutting tip projects to a greater or lesser degree, as viewed in a radial direction, from the circumference of the cutting tip 7.

The substantially cylindrical base body of the cutting head 5 has, on the front side of the cutting tip 7 a chip run-out bevel 19 which serves for forming a space for chips.

In the reamer 1, the guide bead 9 is so formed that it has, in the region adjacent to the front end surface 21 of the cutting head 5, a run-on bevel 23. The cutting tip 7 is also provided, in its front region, with a bevel which defines the main cutting edge 25 of the cutting tip 7.

In the embodiment shown in FIG. 1, the first guide bead 9 extends continuously from the front end surface 21 of the cutting head 5 almost to its rear end region. Thus, the length of the first guide bead 9 is greater, in the direction of the central, rotational, axis 11, then that of the cutting tip 7.

Figure 2:
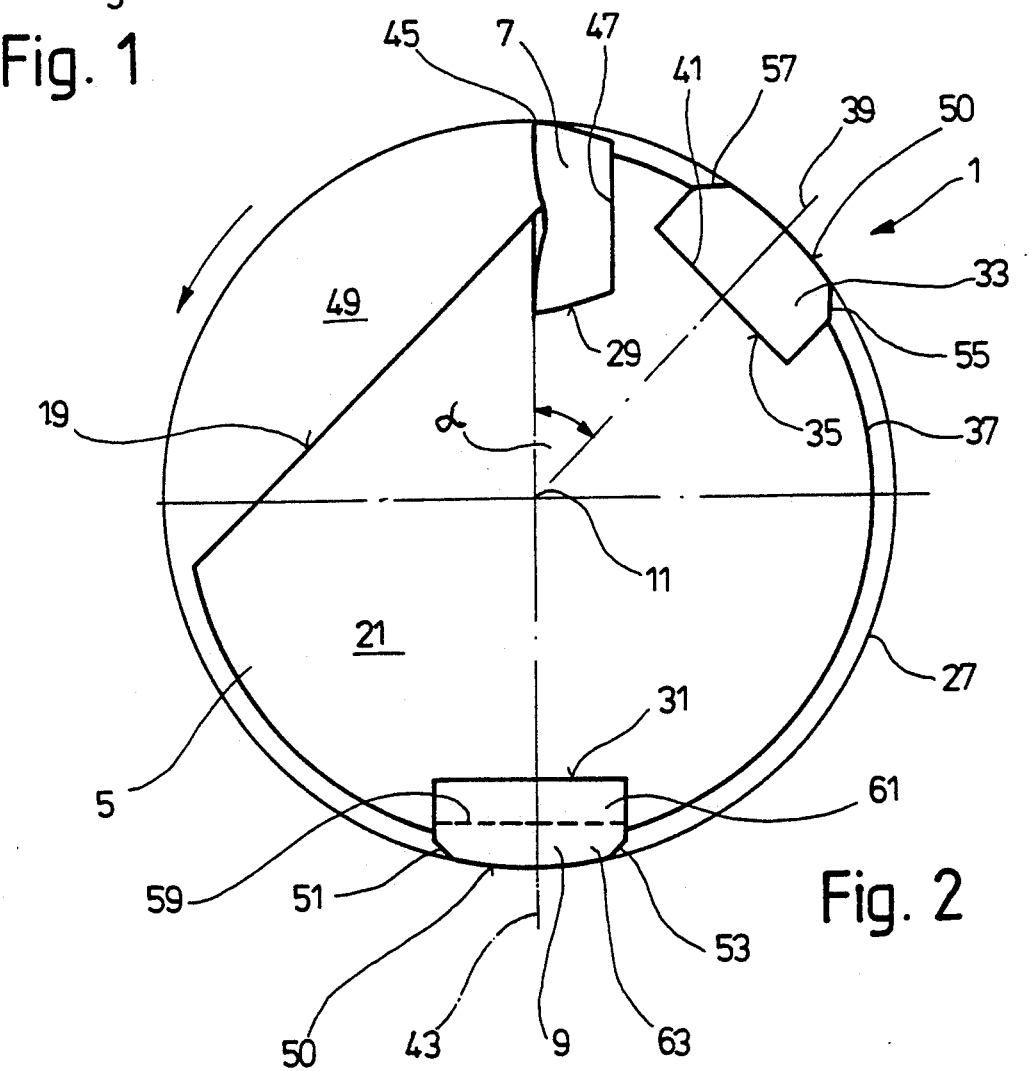
FIG. 2 show a front end view of the reamer shown in FIG. 1.

FIG. 2 shows a front end view of the reamer 1 and, thus, the front end view of the cutting head 5. The circular line 27 designates the machined bore. In FIG. 2, the elements that correspond to those in FIG. 1 are designated with the same reference numerals as in FIG. 1, and references will be made to the description of FIG. 1.

FIG. 2 shows that the cutting tip 7 is received in a first groove 29, the first guide bead 9 is received in a second groove 31, and the second guide bead 33 is received in a third groove 35. The second guide bead 33 is arranged in the circumferential wall 37 of the cutting head 5 after the cutting tip 7 in the rotational direction of the reamer 1, which is designated with arrow. The central axis 39 extending through the second guide bead 33, extends perpendicular to the bottom 41 of the third groove 35, intersects the rotational axis 11 of the reamer 1, and forms an angle with elongated axis 43 that extends through the first guide bead. The angle can be in the region of 30°–50° and, preferably, 40°–45°. In the embodiment shown in FIG. 2, it is equal to 45°.

The elongated axis 43 extends up to the active cutting edge 45 of the cutting tip 7, which engages the bore wall designated with the circular line 27. The bottom side 47 of the cutting tip 7 extends, in the shown embodiment, substantially parallel to the axis 43. It is also possible that the bottom cutting edge of the embodiment, shown in FIG. 2, extends backward and, thus, is spaced from the axis 43, which contacts the active cutting edge. In this case, the bottom side 47 is located nearer to the second guide bead 33.

As shown in FIG. 2, a space for chips 49 remains between the chip run-out bevel 19 of the cutting head 5 and the bore wall designated by the circular line 27. The chips, which are cut by the active cutting edge 45 of the cutting tip 7 during rotation of the reamer 1, are removed through the space 49.

Both guide beads 9 and 33 are provided, on their respective bore-contacting outer surfaces 50 with a curve, which substantially corresponds to the bore wall designated with the circular line 27. Advantageously, the curve radius of the guide beads 9 and 33 is selected somewhat smaller than the orbital radius. The size can be so selected that the curve radius of the guide beads 9 and 33 is by 1–15%, in particular by 4 to 5% smaller than the orbital radius.

The outer surface of the guide beads 9 and 33 have, at least along one of the longitudinal edges thereof, respective chamfers 51, 53, 55, and 57. In particular, the front chamfers 53 and 57, when viewing in the rotational direction, serve for forming lubricating films, in the case when a cooling and lubricating medium is used during machining of the bore with a reamer, which medium also serves for removal of the chips. Especially with a rather small curvature of the outer surfaces of the guide beads 9 and 33, a very stable lubricating film is formed.

A parting plane 59 is shown in the first guide bead 9 which is located opposite the cutting tip 7. The outer or contact surfaces of the guide beads 9 and 33 contain, at least in the regions that, abut the bore wall designated by the circle line 27, a diamond material. In particular, guide beads are used, which have a base body made of metal, preferably, hard metal, and a diamond padding 63 attached to the base body. Preferably, a padding of artificial or industrial diamonds is used.

The parting plane 59 extends parallel to an imaginary axis, which is shown in FIG. 2 as forming a right angle with the axis 43 that extends transverse to the parting plane 59 and defines the mean perpendicular of the parting plane 59. The distance of the parting plane 59 from the rotational axis 11 can be varied. It is also, e.g., possible to simply provide a diamond layer in the outer region of the guide bead that lies in the immediate vicinity of the axis 43. In this case, the parting plane 59 extends closely adjacent to the outer surface 50 of the guide bead 9.

The second guide bead 33 can be formed likewise, with a parting plane 59, base body 61 and a diamond padding 63.

In the case when instead of a diamond padding, a diamond layer is provided on the outer surface of the guide bead, the parting plane follows, with a layer of a comparable thickness, the outer profile of the guide bead.

FIG. 2 shows an embodiment of a reamer with two identical guide beads.

During machining of a bore, the rotational axis 11 does not coincide with the center of the bore, and in many cases, the rear edge of the second guide bead 33 and its surface immediately before the chamfer 55, are heavily loaded, while the front region of the outer surface of the first guide bead 9 immediately in front of the chamfer 53 is subjected to an extensive wear. It is thus possible to provide, exactly these regions with a diamond layer or coating, and to so arrange the parting plane 59 within the guide bead that the desired wear region is formed of a diamond material.

Figure 3:
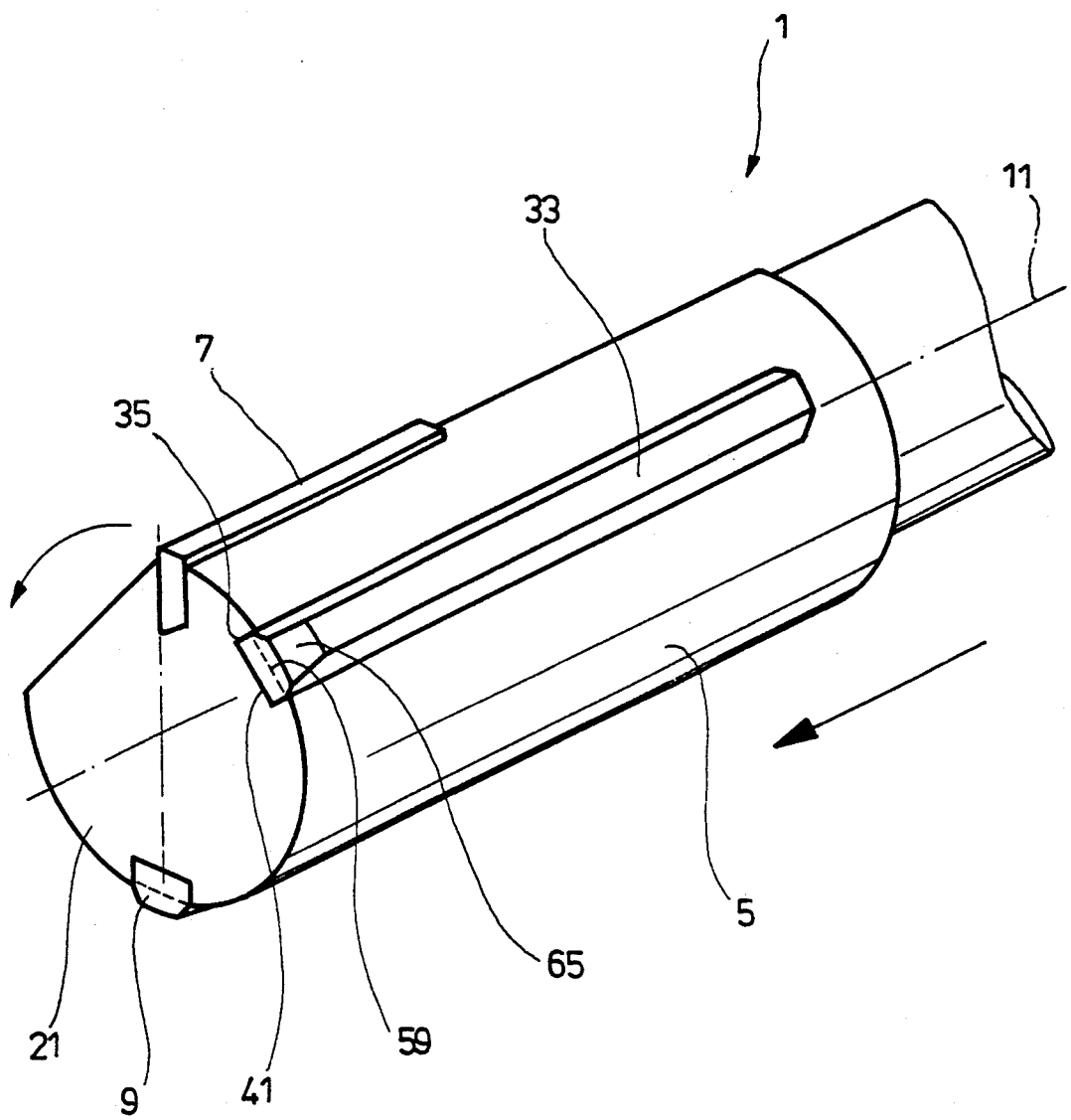
FIG. 3 shows a perspective view of a first embodiment of a reamer according to the present invention.

The perspective view according to FIG. 3 shows a reamer shown in FIG. 1. The same elements are designated with the same reference numerals, so that a reference to the previous description can be made. The second guide bead 33, as the first guide bead 9, is formed as a through guide bead. In the embodiment shown in FIG. 3, the parting plane 59 of the second guide bead is arranged in such proximity to the bottom 41 of the third groove 35 that the whole outer surface of the second guide bead consists of a diamond material. In the front region of the second guide bead and, thus, at the end of the guide bead, which is adjacent to the end surface 21 of the cutting head 5, a run-on bevel 65 is provided that likewise consists of a diamond material and is, therefore, very wear-resistant. Upon entering of the reamer in the bore, it rotates in a direction indicated in FIG. 3 by an arrow. Simultaneously, the reamer is displaced in a direction indicated by the large arrow. Because the cutting tip 7 is arranged, when viewed in the displacement direction, in front of the guide beads, it engages first the wall of the machined bore. Thereby, the reamer is drifted in the direction of the first guide bead 9, so that the latter, as being closest to the bore wall, contacts the bore wall under high pressure and takes up the cutting force. Because of the diamond layer, build-ups during machining of aluminum parts, with use of very lean emulsions, are effectively prevented. Finally, both guide beads abut the machine bore wall when the reamer 1 is inserted further into the bore so that the reamer automatically centers itself.

Figure 4:
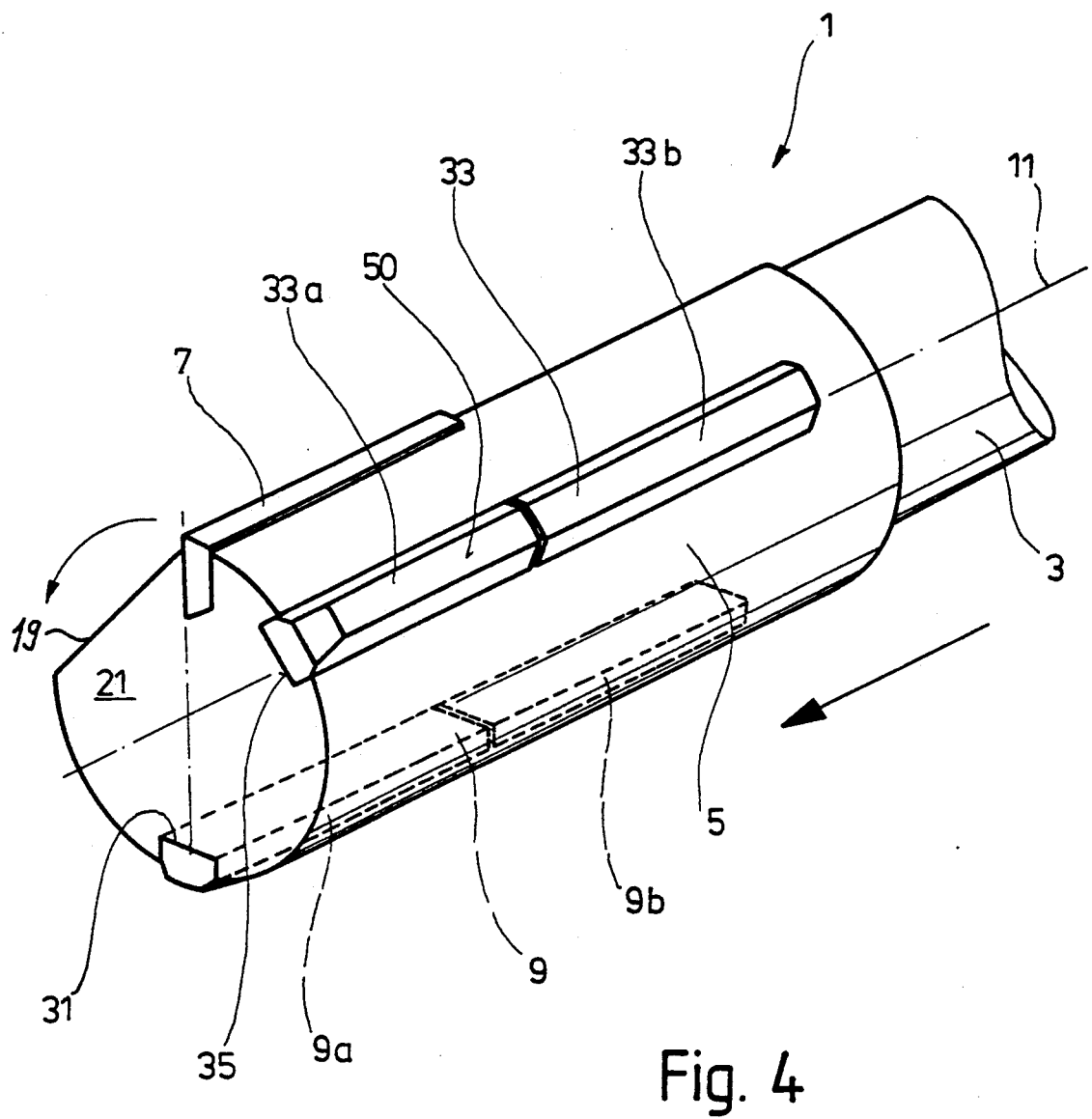
FIG. 4 shows a perspective view of a second embodiment of a reamer according to the prevent invention.

The reamer of the embodiment in FIG. 4 is basically formed in the same way as that of FIG. 3 and the same elements are designated with the same reference numeral and will be discussed with reference to the previous description.

The essential difference between the two embodiments consists in that the guide beads 9 and 33 are formed not of a single through element but of two elements, a front part 9a or 33a and a rear part 9b or 33b.

The front parts of both guide beads are subjected to an especially high wear and, therefore, have, on their outer or contact surface 50, a diamond layer. The rear parts 9b or 33b of the two guide beads 9 and 33 are made of a hard metal and have no diamond layer on their outer or contact surfaces. A reamer according to the embodiment of FIG. 4 is cheaper than that of FIG. 3 the outer surfaces of the guide beads of which are completely layered with a diamond material.

It is especially cheap to form a single-cutter reamer so that only the first guide element, which lies opposite the cutting tip, has a diamond layer and only in its front region, because it is in this region that the highest friction forces occur, such a reamer can, e.g., be formed as shown in FIG. 4, so that only front part 9a of the first guide bead 9 is provided with a diamond layer on its outer or contact surface, and with the rear part 9b being completely made of a hard metal. In such a reamer, the second guide bead is formed completely of a hard metal and is formed as a single through element as that shown in FIG. 3. Thus, a reamer can be formed as a combination of elements shown in FIGS. 3 and 4, with the first guide bead being formed as a two-part element, as shown in FIG. 4, and with the second guide bead being formed as a single through element, as shown in FIG. 3.

A common feature of both embodiments consists in that both guide beads 9 and 33 have an essentially rectangular cross-section. Correspondingly, the associated grooves for receiving the guide beads are formed likewise. The size of grooves is so selected that he guide beads are received therein without any clearance. It is also possible to make the guide beads with a square cross-section and form correspondingly, the receiving grooves. It is especially advantageous to solder the guide beads in the body of the cutting head. It is also possible to glue the guide beads in the grooves of the cutting head or formlockingly retain them there. When a formlocking connection is used, it is advantageous to form the guide beads with a trapezoidal cross-section when their bottom side that lies on the base surface of the associated groove is wider than their outer or contact side. The guide bead receiving grooves are formed accordingly, so that the formlocking connection between the groove and the guide bead works as a dovetail connection. In addition to the formlocking connection, the guide beads can be solded or glued in the grooves.

It is further envisaged that the width of the guide beads correspond to the loads occuring during machining of bores. On this basis, the position of the parting plane 59 can be determined and whether the contact surfaces should be layered with a diamond material or formed with of a diamond material to a greater or lesser degree. When the parting plane 59 is located very closely to the bottom surface 41 of the groove, the thickness of the diamond layer is very big, and the run-on bevel of the guide bead and its chamfers are also formed of a diamond material. By appropriated positioning of the parting plane 59, it can be assured that the chamfers 51,53,55 and/or 57 are protected from wear by a diamond material.

An optimal protection of the guide beads against wear is then assured, when a molecular bonding exists between the diamond material and the metal of the base body of the guide bead, preferably hard metal, when practically inseparable bond is obtained.

From the foregoing description , it is clear that it is possible to provide a diamond padding or a diamond layer in all cases.

A common feature of all guide beads is that their outer or contact surfaces are cylindrically ground whereby the curvature radius corresponds substantially to the orbital radius, with the curvature radius being smaller by about 1 to 15%, preferably 3-5% then the orbital radius. With such selection of the radius of curvature, a stable lubricating film is obtained between the guide bead and the bore wall. In particular, a wedge lubricating film is obtained between the guide bead and the bore wall in the front clearance, when viewed in the rotational direction. Such a wedge lubricating film is not sheared off even with large contact forces acting between the guide bead and the bore wall. Such lubricating films are required along front chamfers extending along the edges of the guide bead.

While particular embodiment of the invention have been shown and described, various modifications thereof will be apparent to those skilled in the art and, therefore, it is not intended that the invention be limited to the disclosed embodiment or to the details thereof, and departures may be made therefrom within the spirit and scope of the invention as defined in the appended claims.

What is claimed is:

1. A reamer, comprising a base body having a circumferential wall; a cutting tip mounted in said circumferential wall; and at least one guide bead mounted in said circumferential wall and extending in a longitudinal direction of said base body, said at least one guide bead having a metal body, and a continuous diamond padding provided on said metal body and defining a contact surface of said bead.

2. A reamer as set forth in claim 1, wherein a molecular bond exists between said metal body and said diamond padding.

3. A reamer as set forth in claim 1, wherein said at least one guide bead is located opposite said cutting tip.

4. A reamer as set forth in claim 1, wherein said at least one guide bead has one of rectangular, square and trapezoidal cross-section.

5. A reamer as set forth in claim 1, wherein said base body has a groove extending in the longitudinal direction thereof for receiving said at least one guide bead, said guide bead being soldered in said groove.

6. A reamer as set forth in claim 1, wherein said contact surface of said at least one guide bead is cylindrically ground.

7. A reamer as set forth in claim 1, wherein said contact surface of said at least one guide bead has a curvature radius which is smaller than an orbit of said at least one guide bead.

8. A reamer as set forth in claim 7, wherein said contact surface of said at least one guide bead has a curvature radius which is smaller than an orbit of said at least one guide bead by about 3 to 5%.

9. A reamer as set forth in claim 1, wherein said at least one guide bead has longitudinal edges and a chamfer provided along at least one of said longitudinal edges.

10. A reamer as set forth in claim 1, wherein said at least one guide bead is formed of two parts, a front part and a rear part.

11. A reamer as set forth in claim 10, wherein only said front part is provided with said diamond padding.

12. A reamer as set forth in claim 10, wherein each of said front and rear parts is provided with said diamond padding.

13. A reamer as set forth in claim 11, wherein said diamond padding comprises a diamond layer.

14. A reamer as set forth in claim 13, wherein said diamond layer is provided in a front region of said contact surface in vicinity of a front end surface of said reamer.

15. A reamer as set forth in claim 1, further comprising another guide bead formed as said one bead.

16. A reamer as set forth in claim 15, wherein one of said guide beads is located opposite said cutting tip, and the other of said guide beads is located, when viewed in a rotational direction of said reamer, at an angle of about 30° to 50° with respect to said cutting tip behind said cutting tip.

17. A reamer as set forth in claim 16, wherein the angle between said other guide bead and said cutting tip is 40° to 45°.

18. A reamer as set forth in claim 16, wherein the angle between said other guide bead and said cutting tip is about 45°.

19. A reamer as set forth in claim 1, wherein said at least one guide bead has a parting plane separating said metal body and said diamond padding and extending substantially parallel to a rotational axis of said reamer, and a central perpendicular to the parting plane and intersecting the rotational axis of said reamer.

20. A reamer as set forth in claim 19, wherein the parting plane follows a profile of said contact surface.

* * * * *